(12) United States Patent
Xu et al.

(10) Patent No.: US 11,195,252 B2
(45) Date of Patent: Dec. 7, 2021

(54) SYSTEM AND METHOD FOR RECTIFYING A WIDE-ANGLE IMAGE

(71) Applicant: SZ DJI TECHNOLOGY CO., LTD., Shenzhen (CN)

(72) Inventors: Rui Xu, Shenzhen (CN); Ketan Tang, Shenzhen (CN); Shaojie Shen, Shenzhen (CN); Qi Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 63 days.

(21) Appl. No.: 16/432,378

(22) Filed: Jun. 5, 2019

(65) Prior Publication Data

US 2019/0287213 A1    Sep. 19, 2019

Related U.S. Application Data

(63) Continuation of application No. PCT/CN2016/108720, filed on Dec. 6, 2016.

(51) Int. Cl.
  *G06T 3/00* (2006.01)
  *G06T 7/33* (2017.01)
  *G02B 13/06* (2006.01)
  *G06T 5/00* (2006.01)

(52) U.S. Cl.
  CPC ............ *G06T 3/0018* (2013.01); *G02B 13/06* (2013.01); *G06T 5/006* (2013.01); *G06T 7/33* (2017.01); *G06T 2207/30208* (2013.01)

(58) Field of Classification Search
  CPC ......... G06T 3/0018; G06T 7/33; G06T 5/006; G06T 2207/30208; G02B 13/06
  See application file for complete search history.

(56) References Cited

U.S. PATENT DOCUMENTS

| 8,463,074 | B2* | 6/2013 | Johnson, III ............ G06T 3/608 |
| | | | 382/296 |
| 9,135,678 | B2* | 9/2015 | Feng ..................... G06T 3/0062 |
| 9,153,014 | B2* | 10/2015 | Yu ........................... G06T 5/006 |
| 9,230,339 | B2* | 1/2016 | Wexler ..................... G06T 7/62 |
| 9,560,269 | B2* | 1/2017 | Baldwin ............ H04N 5/23206 |

(Continued)

FOREIGN PATENT DOCUMENTS

| CN | 101814181 A | 8/2010 |
| CN | 102479379 A | 5/2012 |

(Continued)

OTHER PUBLICATIONS

World Intellectual Property Organization (WIPO) International Search Report and Written Opinion for PCT/CN2016/108720 dated Aug. 28, 2017 7 Pages.

(Continued)

*Primary Examiner* — Mia M Thomas
(74) *Attorney, Agent, or Firm* — Anova Law Group, PLLC

(57) ABSTRACT

An image rectification method includes determining one or more reference points in a raw image captured using a lens for a plurality of target pixels in a target image, obtaining a subsection of the raw image based on the one or more reference points, and calculating a target pixel value for each of the plurality of target pixels based on one or more pixel values of one or more pixels in the subsection of the raw image.

12 Claims, 12 Drawing Sheets

(56) References Cited

U.S. PATENT DOCUMENTS

| | | | |
|---|---|---|---|
| 9,787,958 B2* | 10/2017 | Hattingh | G06F 3/011 |
| 9,805,281 B2* | 10/2017 | Wu | G06K 9/3283 |
| 9,807,359 B1* | 10/2017 | Moule | G06T 5/006 |
| 9,883,101 B1* | 1/2018 | Aloumanis | G02B 13/06 |
| 10,078,782 B2* | 9/2018 | Krichen | G06K 9/00617 |
| 10,105,049 B2* | 10/2018 | Sinha | A61B 3/0025 |
| 10,192,135 B2* | 1/2019 | Krenzer | G06T 7/13 |
| 10,225,473 B2* | 3/2019 | Alibay | H04N 5/145 |
| 10,354,547 B1* | 7/2019 | Falstrup | G02B 27/0172 |
| 10,390,007 B1* | 8/2019 | Chen | H04N 13/366 |
| 10,412,365 B2* | 9/2019 | Zhang | H04N 17/002 |
| 10,621,743 B2* | 4/2020 | Kiyota | G06T 3/0062 |
| 10,735,713 B2* | 8/2020 | Zabatani | G06F 3/017 |
| 10,757,395 B2* | 8/2020 | Nobori | B60R 1/00 |
| 11,037,308 B2* | 6/2021 | Chen | G06T 7/194 |
| 11,044,399 B2* | 6/2021 | Chen | G06K 9/00771 |
| 2004/0042662 A1* | 3/2004 | Wilensky | G06K 9/342 382/194 |
| 2004/0076340 A1* | 4/2004 | Nielsen | G06T 5/006 382/284 |
| 2005/0213838 A1* | 9/2005 | Kuramoto | H04N 1/4097 382/254 |
| 2009/0041378 A1* | 2/2009 | Yamaoka | G06T 5/006 382/275 |
| 2010/0045774 A1* | 2/2010 | Len | H04N 5/2254 348/36 |
| 2010/0231721 A1* | 9/2010 | Meloche | G08G 5/065 348/159 |
| 2010/0302395 A1* | 12/2010 | Mathe | A63F 13/213 348/222.1 |
| 2011/0176731 A1* | 7/2011 | Fukushi | G06T 7/32 382/170 |
| 2012/0114262 A1* | 5/2012 | Yu | G06T 5/006 382/254 |
| 2013/0135474 A1* | 5/2013 | Sakano | G06K 9/00791 348/148 |
| 2013/0258047 A1* | 10/2013 | Morimoto | G06T 5/006 348/36 |
| 2014/0056479 A1* | 2/2014 | Bobbitt | G06K 9/00771 382/104 |
| 2014/0125656 A1* | 5/2014 | Mishima | H04N 13/111 345/419 |
| 2014/0347469 A1* | 11/2014 | Zhang | B60R 11/04 348/118 |
| 2015/0036014 A1* | 2/2015 | Lelescu | G06T 3/4007 348/218.1 |
| 2015/0170002 A1* | 6/2015 | Szegedy | G06K 9/4628 382/156 |
| 2015/0178884 A1* | 6/2015 | Scholl | G06T 3/0018 348/36 |
| 2015/0232031 A1* | 8/2015 | Kitaura | G06T 3/4038 348/148 |
| 2015/0310274 A1* | 10/2015 | Shreve | G06T 7/20 382/103 |
| 2016/0048973 A1* | 2/2016 | Takenaka | G06K 9/6202 382/199 |
| 2016/0065930 A1* | 3/2016 | Chandra | G06T 7/223 348/46 |
| 2016/0080647 A1* | 3/2016 | Kimura | G06T 3/0012 348/36 |
| 2016/0119541 A1* | 4/2016 | Alvarado-Moya | G06T 3/0018 348/38 |
| 2016/0353094 A1* | 12/2016 | Rougeaux | G02B 27/0172 |
| 2017/0059412 A1* | 3/2017 | Ye | G01J 3/0256 |
| 2017/0251193 A1* | 8/2017 | Zhou | H04N 13/296 |
| 2017/0287107 A1* | 10/2017 | Forutanpour | G06T 3/0062 |
| 2017/0330337 A1* | 11/2017 | Mizutani | G06T 5/006 |
| 2018/0114291 A1* | 4/2018 | Yi | H04N 5/23238 |
| 2018/0268528 A1* | 9/2018 | Matsushita | G06T 5/006 |
| 2018/0365797 A1* | 12/2018 | Yu | G06T 3/0018 |
| 2019/0089940 A1* | 3/2019 | Zhang | H04N 13/398 |
| 2019/0096137 A1* | 3/2019 | Holzer | G06T 7/70 |
| 2019/0197734 A1* | 6/2019 | Briggs | H04N 5/247 |
| 2019/0208216 A1* | 7/2019 | Yamori | H04N 5/2254 |
| 2019/0260928 A1* | 8/2019 | Kunishige | H04N 5/2254 |
| 2019/0279681 A1* | 9/2019 | Yuan | G11B 27/031 |
| 2019/0289205 A1* | 9/2019 | Lin | G06T 15/10 |
| 2019/0318178 A1* | 10/2019 | Kauffmann | B60R 1/00 |
| 2019/0392593 A1* | 12/2019 | Roa | G06T 7/529 |
| 2020/0103281 A1* | 4/2020 | Ye | G01J 3/4531 |
| 2020/0219283 A1* | 7/2020 | Nishikawa | G06F 3/011 |
| 2020/0234413 A1* | 7/2020 | Park | G06T 5/001 |
| 2020/0258198 A1* | 8/2020 | Kuwabara | H04N 5/23238 |
| 2020/0273205 A1* | 8/2020 | Yamashita | H04N 17/00 |
| 2020/0280678 A1* | 9/2020 | Hariyani | B60R 11/04 |
| 2020/0366838 A1* | 11/2020 | Wang | G06T 5/006 |

FOREIGN PATENT DOCUMENTS

| | | |
|---|---|---|
| CN | 103824296 A | 5/2014 |
| CN | 103839227 A | 6/2014 |
| CN | 104240236 A | 12/2014 |
| JP | 2005135096 A | 5/2005 |
| JP | 2012105246 A | 5/2012 |
| JP | 2015215817 A | 12/2015 |
| WO | 2015140514 A1 | 9/2015 |

OTHER PUBLICATIONS

Ciaran Hughes, et al., Review of Geometric Distortion Compensation in Fish-Eye Cameras, Irish Signals and Systems Conference, ISSC 2008: Jun. 18-19, 2008, pp. 162-167, National University of Ireland, Galway.

* cited by examiner

SYSTEM AND METHOD FOR RECTIFYING A WIDE-ANGLE IMAGE

CROSS-REFERENCE TO RELATED APPLICATION

This application is a continuation of International Application No. PCT/CN2016/108720, filed on Dec. 6, 2016, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to image processing and computer vision, and more particularly, but not exclusively, to rectifying a wide-angle image.

BACKGROUND

Wide-angle lenses, such as the fisheye lenses, can be used in various recreational and commercial applications where a wide angle of view is beneficiary. For example, the fisheye lenses are useful in products such as panoramic cameras and vision systems (e.g. for parking or security monitoring). However, most wide-angle lens applications are not satisfactory, due to the need for efficiently eliminating geometry distortion in the wide-angle images. This is the general area that embodiments of the disclosure are intended to address.

SUMMARY

Described herein are systems and methods that provide a technical solution for rectifying a wide-angle image captured using a wide-angle lens. The system can obtain a projection model for the wide-angle lens, wherein the projection model corresponds the wide-angle image with a plurality of target image portions in a target image. Furthermore, the system can determine, based on the projection model, a plurality of reference pixels in the wide-angle image for a target pixel in the plurality of target image portions. Then, the system can calculate one or more pixel values for said target pixel based on the plurality of reference pixels in the wide-angle image.

Also described herein are systems and methods that provide a technical solution for rectifying a fisheye image captured using a fisheye lens. The system can determine, for a set of target pixels in a target image, one or more reference points in the fisheye image. Furthermore, the system can obtain a subsection of the fisheye image based on the one or more reference points. Then, the system can calculate one or more pixel values for each said target pixel in the set of target pixels, based on pixel values of one or more pixels in the subsection of the fisheye image.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses a fisheye lens as example for a wide-angle lens. It will be apparent to those skilled in the art that other types of wide-angle lenses can be used without limitation.

In accordance with various embodiments, a technical solution can be provided for rectifying a wide-angle image captured using a wide-angle lens. The system can obtain a projection model for the wide-angle lens, wherein the projection model corresponds the wide-angle image with a plurality of target image portions in a target image. Furthermore, the system can determine, based on the projection model, a plurality of reference pixels in the wide-angle image for a target pixel in the plurality of target image portions. Then, the system can calculate one or more pixel values for said target pixel based on the plurality of reference pixels in the wide-angle image.

In accordance with various embodiments, a technical solution can be provided for rectifying a fisheye image captured using a fisheye lens. The system can determine, for a set of target pixels in a target image, one or more reference points in the fisheye image. Furthermore, the system can obtain a subsection of the fisheye image based on the one or more reference points. Then, the system can calculate one or more pixel values for each said target pixel in the set of target pixels, based on pixel values of one or more pixels in the subsection of the fisheye image. In this disclosure, an image being rectified (such as the fisheye image) is also referred to as a "raw image," and the pixel value for a target pixel is also referred to as a "target pixel value."

Figure 1:
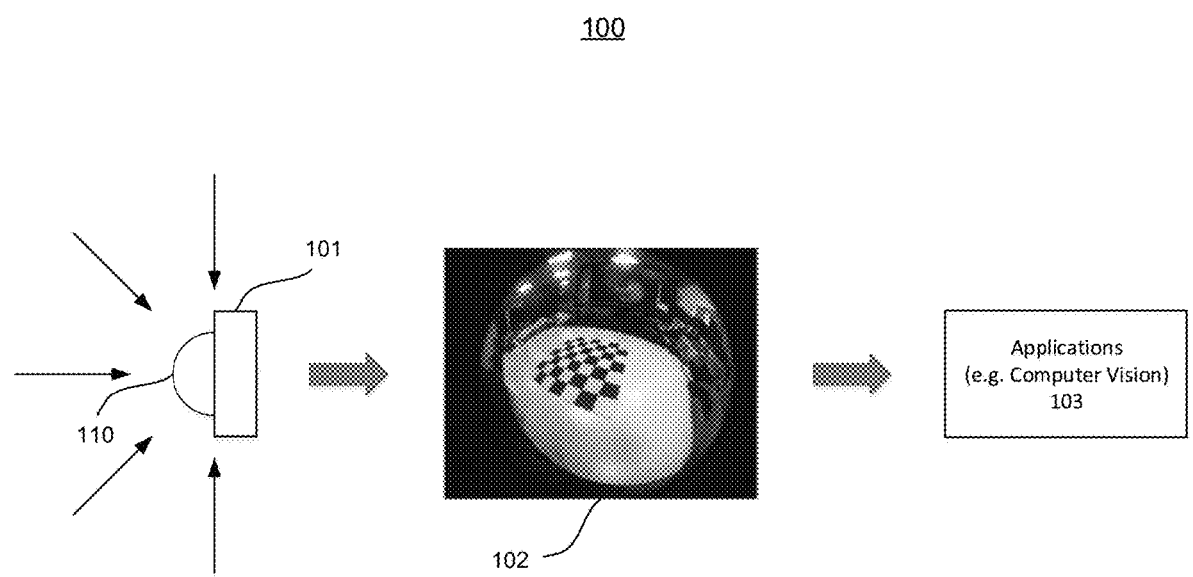
FIG. 1 shows an exemplary illustration of a fisheye vision system, in accordance with various embodiments of the present disclosure.

FIG. 1 shows an exemplary illustration of a fisheye vision system, in accordance with various embodiments of the present disclosure. As shown in FIG. 1, an image device 101, such as a camera with a fisheye lens 110, can be used for capturing a fisheye image 102.

For example, the camera may have a fisheye lens 110 with a 180 degree of angle of view and is capable of capturing images of a hemispherical field in front of the camera. Alternatively, the fisheye lens 110 may have a different degree of angle of view. Thus, the image device 101 can capture images with different field of view. In the example as shown in FIG. 1, the fisheye image 102 can be a circular fisheye image, which has an image circle inscribed in the image frame. Alternatively, the fisheye image 102 can be a full-frame fisheye image with portions of the image circle circumscribed.

In accordance with various embodiments, comparing with the conventional images, a fisheye image 102 can produce significant more imaging information due to a larger field of view. Thus, it is advantageous to use an image device 101 with a fisheye lens 110 in various applications. In accordance with various embodiments, the fisheye image 102 can be used in various applications 103 (such as computer vision). For example, instead of combining multiple conventional cameras with narrow angle of views, an unmanned aerial vehicle (UAV) can rely on a fisheye lens camera or image sensor for performing various computer vision based navigation tasks while keeping the weight and complexity of the system under control.

On the other hand, wide-angle lenses, including ultra wide lens such as the fisheye lenses, may have inherent distortions that is difficult to be approximated using the conventional pinhole camera model. As shown in FIG. 1, the fisheye image 102 has geometry distortions, especially in the region close to the edge. In some instances, different fisheye lens may distort image differently, which can be characterized using a mapping function or a projection model.

In order to support for various applications, e.g. the different computer vision algorithms, the system can use a rectification process for correcting or eliminating the geometry distortion in the captured fisheye image. In some instances, various algorithms can be used for rectifying the fisheye images. For example, a spherical coordinate method with longitude mapping can be used for rectifying the fisheye images. However, the accuracy for this method is not satisfactory. Also, the spherical coordinate method may need to abandon edge portion of the fisheye image, which limits the application in the field of computer vision. On the other hand, a polynomial coordinate transformation method requires complex and intensive computation for fitting high-order polynomials. Additionally, a rectification method, based on the spherical perspective projection constraint, needs to use a nonlinear optimization method to solve for the tangential and radial deformation parameters (i.e. the accuracy of this method depends on the selection of initial values). Both these methods are computationally intensive, which limit their application in the field of computer vision.

Figure 2:
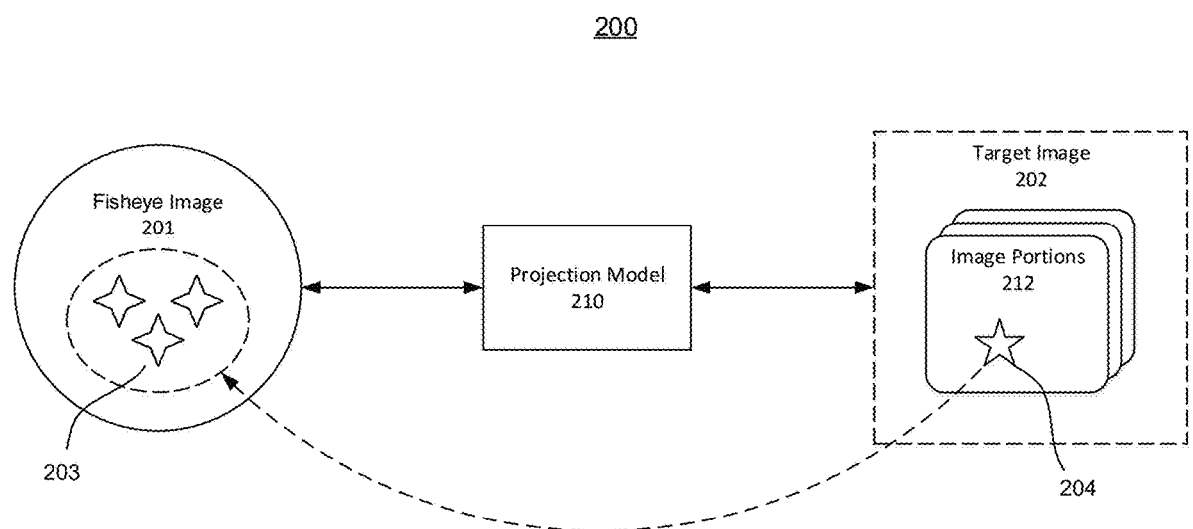
FIG. 2 shows an exemplary illustration of using a projection model for rectifying a fisheye image, in accordance with various embodiments of the present disclosure.

FIG. 2 shows an exemplary illustration of using a projection model for rectifying a fisheye image in an image processing environment 200, in accordance with various embodiments of the present disclosure. As shown in FIG. 2, a projection model 210 can be used for rectifying a fisheye image 201, which may be captured using a camera with a fisheye lens. In one embodiment, the projection model 210 can be based on a pinhole model, which is more often used by a conventional camera with a narrow-angle of view. The drawback for applying a pinhole model on the fisheye image 201 is that it is difficult to achieve full calibration due to the need to know the direction of a back-projected ray for each image point.

In accordance with various embodiments, a projection model 210 can be used for projecting a wide-angle image, such as the fisheye image 201, into multiple image portions 212 of a target image 202. For example, a cubic surface projection model can project a fisheye image 201 (e.g. with at least a portion of a spherical view such as a hemispherical view) into five image portions, e.g. the front, back, left, right, and bottom (or top) portions of a cubic surface. Alternatively, a projection model can be configured to project the fisheye image 201 into any number of image portions.

In accordance with various embodiments, the pixel value(s) for each pixel in the target image 202 can be determined based on the projection model 210. Here, the projection of a target pixel in the target image 202 may not locate exactly on a pixel in the fisheye image 201. Thus, the pixel values of multiple fisheye image pixels in a neighboring block 203 may be used for calculating the pixel value of a pixel 204 in the target image 202.

Figure 3:
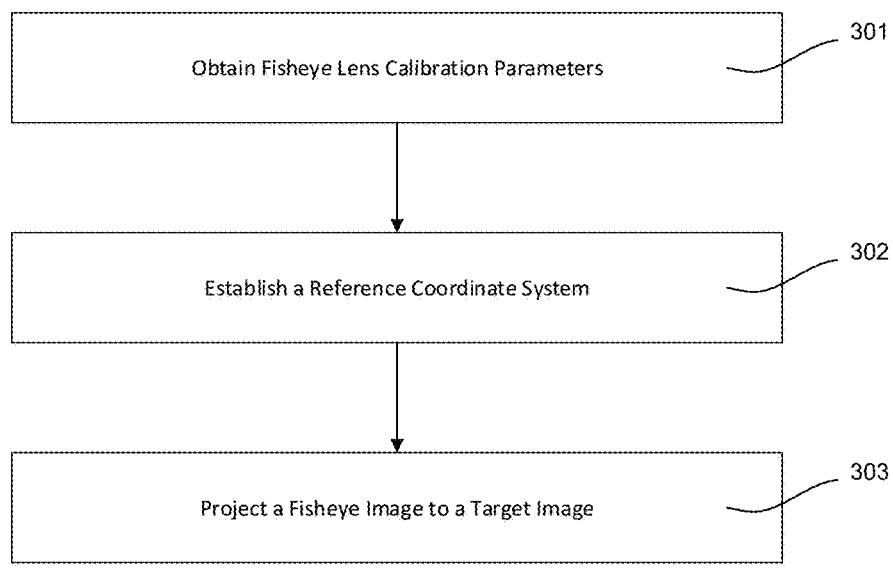
FIG. 3 shows an exemplary illustration of a processor for rectifying a fisheye image, in accordance with various embodiments of the present disclosure.

FIG. 3 shows an exemplary illustration of using a processor for rectifying a fisheye image, in accordance with various embodiments of the present disclosure. As shown in FIG. 3, at step 301, the processor can obtain various calibration parameters based on fisheye calibration. In accordance with various embodiments, a calibration process can calibrate a wide-angle lens, such as a fisheye lens, based on a projection model (or camera model).

Figure 4:
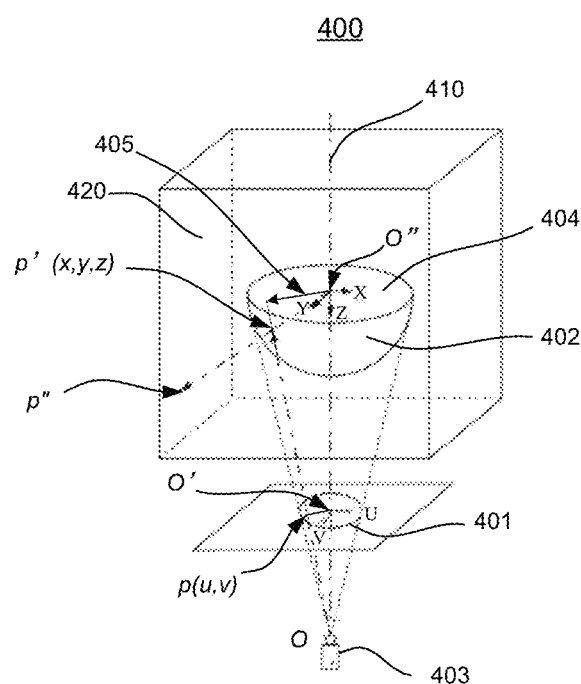
FIG. 4 shows illustration of an exemplary projection model for rectifying a fisheye image, in accordance with various embodiments of the present disclosure.

FIG. 4 shows illustration of an exemplary projection model 400 for rectifying a fisheye image, in accordance with various embodiments of the present disclosure. In the example as shown in FIG. 4, a fisheye image 401 can be rectified based on a projection model using a polynomial function, $$f(\rho)=a_0+a_1\rho+a_2\rho^2+a_3\rho^3+a_4\rho^4,$$

where $\rho=\sqrt{u^2+v^2}$ for each point (u, v) in an image coordinate system (U-V) in the fisheye image 401, and f(u, v)=f(ρ) is the corresponding mapping value 405 in a reference coordinate system (X-Y-Z) by an affine transformation.

In accordance with various embodiments, the coefficients in the above polynomial function can be determined via a calibration of the fisheye lens 403. For example, the calibration process may include using the fish-eye lens 403 to capture images of a checkerboard, and extracting corner points based on the number of horizontal and vertical cells, cell size and other parameters. Then, the calibration process can obtain the calibration parameters such as the polynomial coefficients by optimizing an objective function. Also, the calibration process can adjust the image center position to optimize the calibration results.

Referring back to FIG. 3, at step 302, the processor can establish a reference coordinate system. The reference coordinate system can be established based on the obtained calibration parameters.

As shown in FIG. 4, a spherical surface 420 can be used for correlating a fisheye image coordinate system with the reference coordinate system. In the example, the fisheye image 401 and a spherical surface 402 can be aligned along an axis 410. The axis 410 can pass through the center point (O') of the fisheye image 401 (e.g. the origin of the reference coordinate system X-Y-Z) and the center point (O") of the spherical surface 402 (e.g. the origin of the image coordinate system U-V). Furthermore, an optic center (O) for the fish-eye lens 403 can also be aligned along the axis 410. For example, for a fish-eye lens with 180 degree of angle of view, the optic center (O) for the fish-eye lens 403 can be configured at a position so that a ray launched from the optical center (O), passing through an edge point of the fisheye image 401, also intersects with an edge point of the hemispherical surface 402.

As shown in FIG. 4, a point p, with a coordinate (u, v) in the fisheye image 401, can be projected to a point p', with a coordinate (x, y, z), on the spherical surface 402 in the reference coordinate system. Here, the distance of the point p, with a coordinate (u, v), from the origin point O' in the fisheye image 401 is $\rho=\sqrt{u^2+v^2}$. The projection model 400 can determine the spatial relationship among the fisheye image 401, the spherical surface 402, and the optical center of the fish-eye lens 403, via f (p) the corresponding mapping value 405. For example, the projection model 400 in the reference coordinate system can be determined based on the following expression.

$$P = \begin{bmatrix} x \\ y \\ z \end{bmatrix} = \begin{bmatrix} u \\ v \\ f(u,v) \end{bmatrix},$$

Thus, each point (u, v) in the image circle can be projected to a point (x, y, z) on the spherical surface 402 in the reference coordinate system X-Y-Z.

Referring back to FIG. 3, at step 303, the system can project a fisheye image to obtain the different image portions of the target image based on a projection model. Different projection models can be prescribed for projecting the fisheye image into different numbers of image portions. Thus, the distortion contained in the fisheye image can be eliminated from each individual image portion of the target image (corresponding to each separate projection angle).

For example, as shown in FIG. 4, the projection model 400 can be used for projecting the points on the spherical surface 402 to the different cubic surfaces 420. The cubic surface projection model 400 can be prescribed using five separate imagery pinhole camera positioned at the center (O") of the spherical surface 420 aiming directly at different cubic faces 420. For example, the projection model for each imager pinhole camera can be determined using the following expression $$R = R_z * R_y * R_x$$

where, $$R_x = \begin{bmatrix} 1 & 0 & 0 \\ 0 & \cos x & -\sin x \\ 0 & \sin x & \cos x \end{bmatrix},$$

$$R_y = \begin{bmatrix} \cos y & 0 & \sin y \\ 0 & 1 & 0 \\ -\sin y & 0 & \cos y \end{bmatrix}, \text{ and}$$

$$R_z = \begin{bmatrix} \cos z & -\sin z & 0 \\ \sin z & \cos z & 0 \\ 0 & 0 & 1 \end{bmatrix}.$$

with x={0,−90,0,90,0}, y={90,0,0,0,−90}, and z=0.

Thus, each point in the fisheye image 401 can be projected to a point on the hemispherical surface 402, which in turn can be projected to a point on a cubic surface accordingly. As a result, a target image, computed using such a cubic surface projection model, can include a square area facing directly to the fisheye image 401 and four rectangular areas for the side angles. In the case of hemispherical view, only a half of each side cubic surface is used for projection from the hemispherical surface 402. In other examples, different sizes or portions of cubic surfaces can be used for projection from the surface 402.

Figure 5:
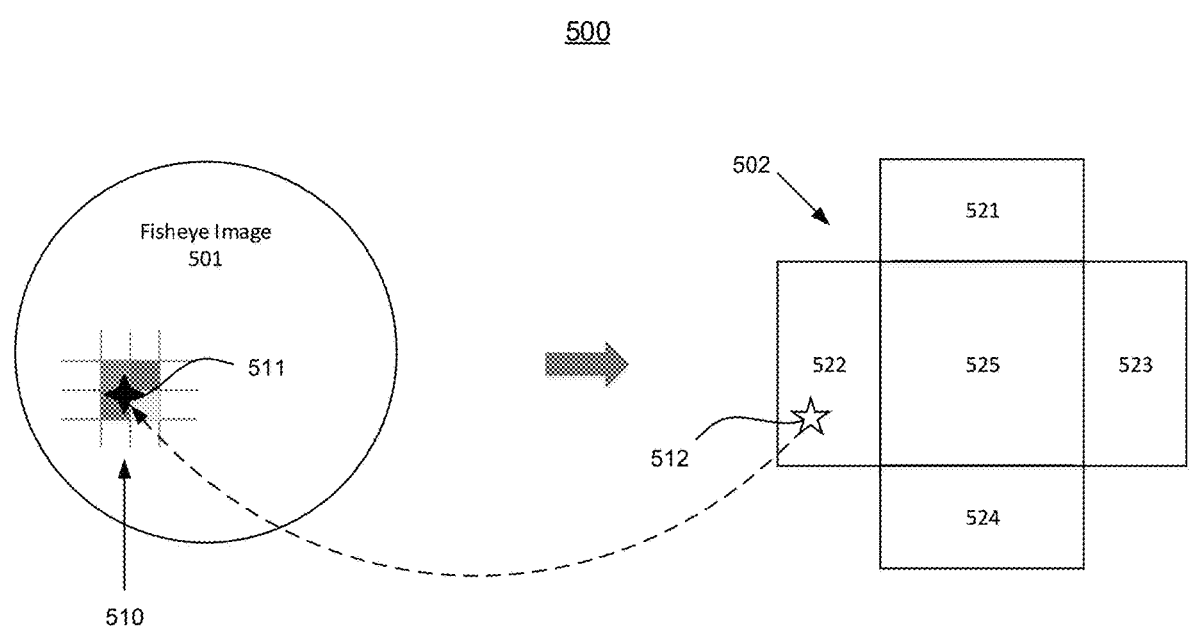
FIG. 5 illustrates processing a target pixel in a target image, in accordance with various embodiments of the present disclosure.

FIG. 5 illustrates processing a target pixel in a target image in an image processing environment 500, in accordance with various embodiments of the present disclosure. As shown in FIG. 5, a fisheye image 501 can be rectified using a target image 502 with multiple image portions 521-525. For example, the target image 502 can include a central portion 525, which is a square area. Surrounding the square area 525 are four rectangular areas 521-524.

In the example as shown in FIG. 4, applying an angle of view of 90 degree on a hemispherical view, the size for the central portion (i.e. block 525) of the target image can be determined based on the pixel focal length f and the number of overlapping pixels v, using a formula w=h=2f+v. For instance, the target image 502, which can be used by various applications or different processing modules, may have a resolution of 640*480. Thus, for a pixel focus length of 240, the size for the central portion can be 480*480. Furthermore, the size for the four side portions of the target image can be 480*240 and 240*480, respectively.

In accordance with various embodiments, each points in the target image 502 can be obtained based on a projection model. In the example as shown in FIG. 4, using the reference coordinate system established based on fisheye calibration parameters, a pixel p" in the target image can be traced back to a point p' on the spherical surface 402. Then, the system can obtain the coordinates of a point p on the fisheye image 401 that corresponds to the point p' on the spherical surface 402, i.e. the pixel p" in the target image (on a cubic surface 420).

As shown in FIG. 5, the pixel value for the pixel 512 (e.g. point p" in FIG. 4) in the target image can be determined based on the projected coordinates 511 (e.g. point p in FIG. 4) in the fisheye image 501. For example, the pixel value for the target pixel 512 can be calculated by applying a weighted average of four neighboring pixels 510 in the fisheye image 501. For example, the pixel value, p, can be determined for each target pixel with a projected coordinate, (i+g, j+h), in the fisheye image 501 using the following formula.

$$p(i+g,j+h)=(1-g)\times(1-h)\times p(i,j)+(1-g)\times h\times p(i,j+1)+g\times(1-h)\times p(i+1,j)+g\times h\times p(i+1,j+1)$$

Here, p(i, j) represents the pixel value at coordinate (i,j) in the fisheye image 501, and g and h indicates the floating relative distance (i.e. with a value between 0 and 1) from the corresponding fisheye image pixel(i,j), since the projected coordinate may not locate at an integer pixel location (i,j).

In accordance with various embodiments, the projection model can be determined for each fisheye lens after calibration. Also, the projected coordinates for each pixel in the target image 502 can be computed and stored. Thus, any image captured using the calibrated fisheye lens can be rectified by applying the pre-stored mapping relationship, i.e. the pixel values (s) for each target pixel in the target image 502 can be estimated based on the stored projected coordinates.

Figure 6:
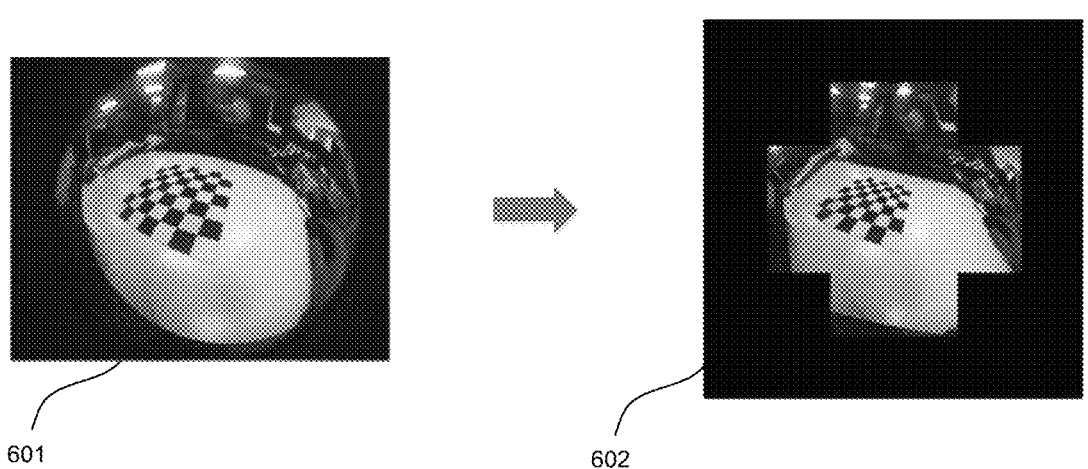
FIG. 6 illustrates rectifying an exemplary fisheye image, in accordance with various embodiments of the present disclosure.

FIG. 6 illustrates rectifying an exemplary fisheye image, in accordance with various embodiments of the present disclosure. As shown in FIG. 6, a rectification process 600 can compute for a target image 602 that rectifies a fisheye image 601. The target image 602 can include a square central portion and four rectangular portions surrounding the square central portion. Each image portion can follow a conventional pinhole projection model for a respective direction. Thus, each individual portion of the target image 602 can be used for various applications, without a need for further transformation or modification. For example, the rectification process 600 can be used for calculating a depth map for the surrounding environment of a UAV which takes advantage of a fisheye lens.

Figure 7:
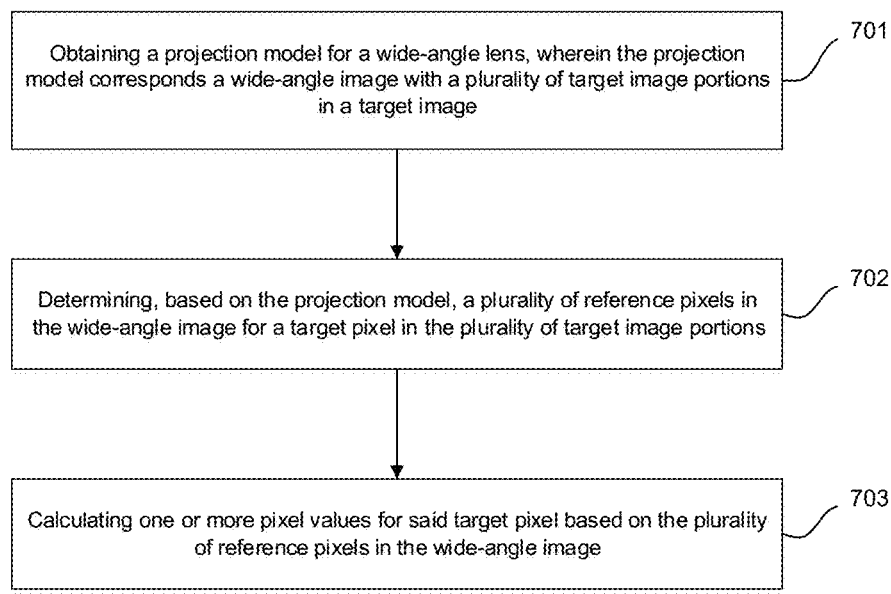
FIG. 7 shows a flowchart of rectifying a wide-angle image captured using a wide-angle lens, in accordance with various embodiments of the present disclosure.

FIG. 7 shows a flowchart of rectifying a wide-angle image captured using a wide-angle lens, in accordance with various embodiments of the present disclosure. As shown in FIG. 7, at step 701, the system can obtain a projection model for the wide-angle lens, wherein the projection model corresponds the wide-angle image with a plurality of target image portions in a target image. For example, the projection model can include a spherical surface model and a cubic surface model as descried in the above sections. Furthermore, at step 702, the system can determine, based on the projection model, a plurality of reference pixels in the wide-angle image for a target pixel in the plurality of target image portions. Then, at step 703, the system can calculate one or more pixel values for said target pixel based on the plurality of reference pixels in the wide-angle image.

Figure 8:
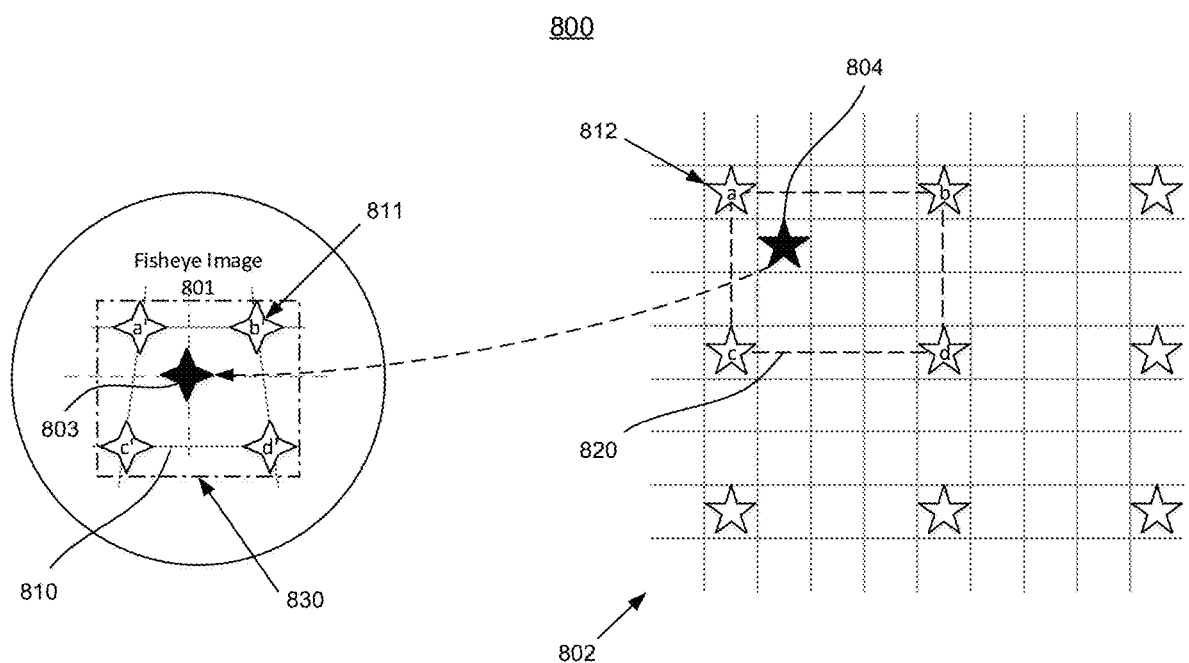
FIG. 8 illustrates an exemplary projection model for using a mesh-based approach to rectify a fisheye image, in accordance with various embodiments of the present disclosure.

FIG. 8 illustrates an exemplary projection model for using a mesh-based approach to rectify a fisheye image, in accordance with various embodiments of the present disclosure. As shown in FIG. 8, a target image 802 can be used for rectifying a fisheye image 801.

In accordance with various embodiments, the rectification of the fisheye image 801 can be based on a mesh-based approach. Instead of directly computing the projected coordinates in the fisheye image 801 for each target pixel in the target image 802, the rectification process 800 can take advantage of a predetermined mesh in the target image 802. For example, the system can compute the coordinates for a mesh of target pixels (or mesh pixels 812) in the target image 802. In some instances, the mesh pixels 812 can be evenly distributed in the target image 802. Alternatively, the distribution of mesh points 812 may not be even, and can be configured following certain rules (e.g. using a logarithm function). In some instances, multiple mesh pixels 812 can form various geometry shapes, e.g. polygon shapes such as rectangles.

Instead of directly computing and pre-storing the projected coordinates in the fisheye image, for each target pixel in the target image 802, the system can first compute the project coordinate 811 for each mesh pixel 812 (i.e. determining the mapping relationship for each mesh pixel). Here, the system may only pre-store the projected coordinates, in the fisheye image, for each mesh pixels 812. Then, the system can estimate the projected coordinates for the target pixels (that are not mesh pixels 812) using interpolation based on the mesh pixels 812.

As shown in FIG. 8, the mesh pixels a-d, which are the corner points for a rectangular mesh cell in the target image 902, can be mapped to points a'-d' in the fisheye image 801. Due to the projective transformation, points a'-d' may not locate exactly at corners of a rectangular in the fisheye image 801. Accordingly, the projected coordinates in the fisheye image 801 for any pixel within the mesh cell can be estimated using interpolation based on the coordinates of points a'-d' in the fisheye image 801.

For example, for a pixel t 804 at location (i, j), in a mesh cell with a size N*N (e.g. 4×4) in the target image 802, the projected coordinates 803 in the fisheye image 801 can be calculated using the following formula.

$$x_t = (N-i)((N-j)x_a + jx_b) + i((N-j)x_c + jx_d)$$

$$y_t = (N-i)((N-j)y_a + jy_b) + i((N-j)y_c + jy_d)$$

Figure 9:
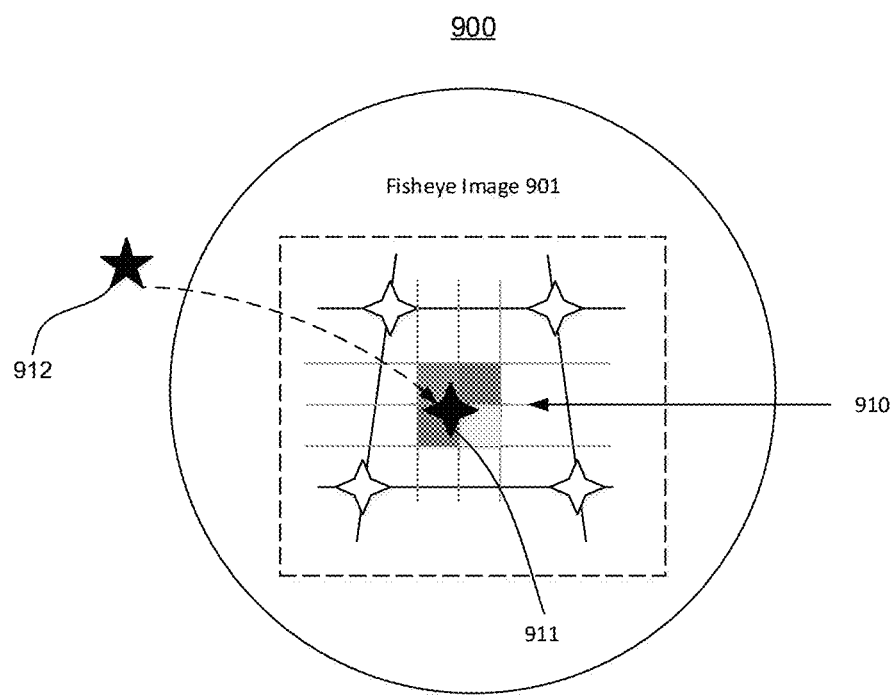
FIG. 9 illustrates processing a target pixel using a mesh-based approach, in accordance with various embodiments of the present disclosure.

In accordance with various embodiments, the pixel value for a target pixel 804 in the target image 802 can be determined based on the projected coordinate 803 in the fisheye image 801. In the example as shown in FIG. 9, a neighboring block 910 in the fisheye mage 901 can be determined based on the projected coordinates 911 for the target pixel 912 in an image processing environment 900. Then, the pixel value for the target pixel 912 can be calculated based on the pixels in a neighboring block 910, e.g. using a linear interpolation.

For example, the coordinates for the pixels in a neighboring block 910 in the fisheye image can be determined using the following formula.

$$x_l = \text{floor}(x_t), x_u = x_l + 1$$

$$y_l = \text{floor}(y_t), y_u = y_l + 1$$

$$x_d = x_t - x_l$$

$$y_d = y_t - y_l$$

Then, the pixel value for the pixel t at location (i, j) can be determined using the following formula.

$$I_t = (1-y_d)((1-x_d)I(x_l,y_l) + x_d I(x_l+1,y_l)) + y_d((1-x_d)I(x_l,y_l+1) + x_d I(x_l+1,y_l+1))$$

Figure 10:
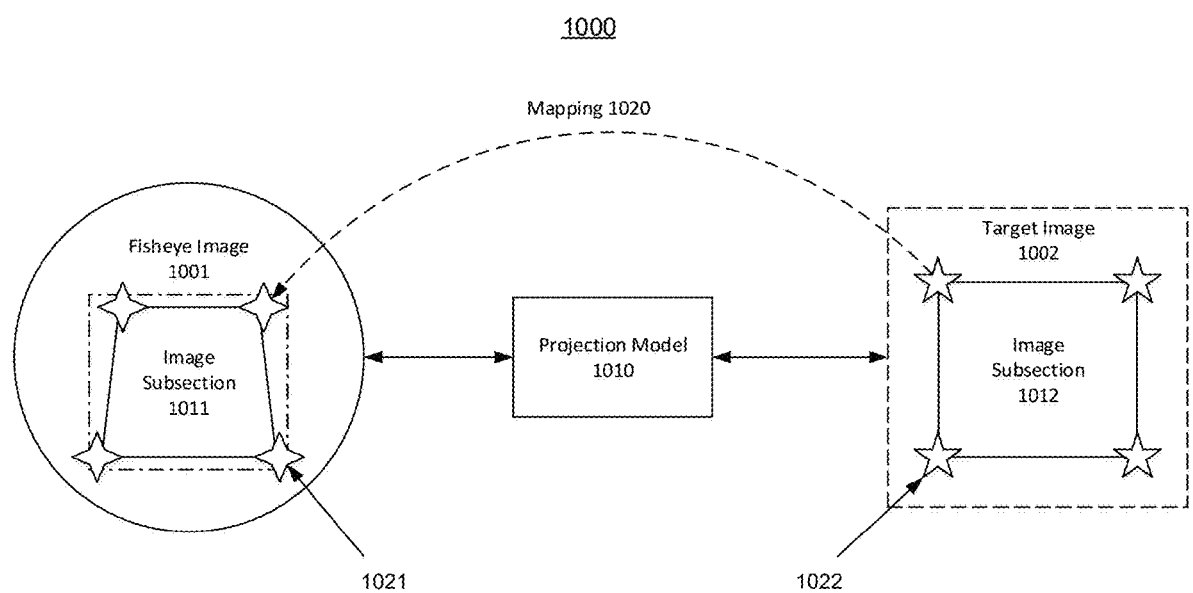
FIG. 10 illustrates rectifying a fisheye image using a mesh-based approach, in accordance with various embodiments of the present disclosure.

FIG. 10 illustrates rectifying a fisheye image using a mesh-based approach, in accordance with various embodiments of the present disclosure. As shown in FIG. 10, a fisheye image 1001 can be rectified using a target image 1002 based on a projection model 1010. The rectification can be based on a mesh-based approach.

In accordance with various embodiments, using the projection model 1010, the rectification process 1000 can determine the mapping relationship 1020 between the mesh pixels 1022 and the projected coordinates 1021 in the fisheye image. Here, the projected coordinates 1021 are determined as the reference points for an image subsection 1012 in the target image 1002. For example, the rectification process 1000 can compute the projected coordinates 1021 for each mesh pixel 1022 using the projection model 1010. Then, the rectification process 1000 can determine an image area (e.g., an image subsection 1011) in the fisheye image 1001 based on the projected coordinates 1021 for the mesh points 1022. For example, this image subsection 1011 can be a minimum bounding rectangular area that encloses the projected coordinates 1021 for the mesh pixels 1022.

In accordance with various embodiments, the mesh-based approach can reduce the consumption of memory and input/output (I/O) bandwidth. In some instances, for a mesh with a cell size of m*m, the required number of pixels, for which the coordinate mapping need to be stored, can be estimated as (W/m+1)*(H/m+1) where W is the image width and H is the image height. In the example as shown in FIG. 8, the mesh size is 4*4. Thus, number of pixels need to be processed and pre-stored can be substantially reduced (compared with the direct-mapping approach, where the mappings for all pixels are stored). As a result, using the mesh-based approach, the system can improve the efficiency for rectifying the fisheye image 801 and reduce the memory consumed.

Figure 11:
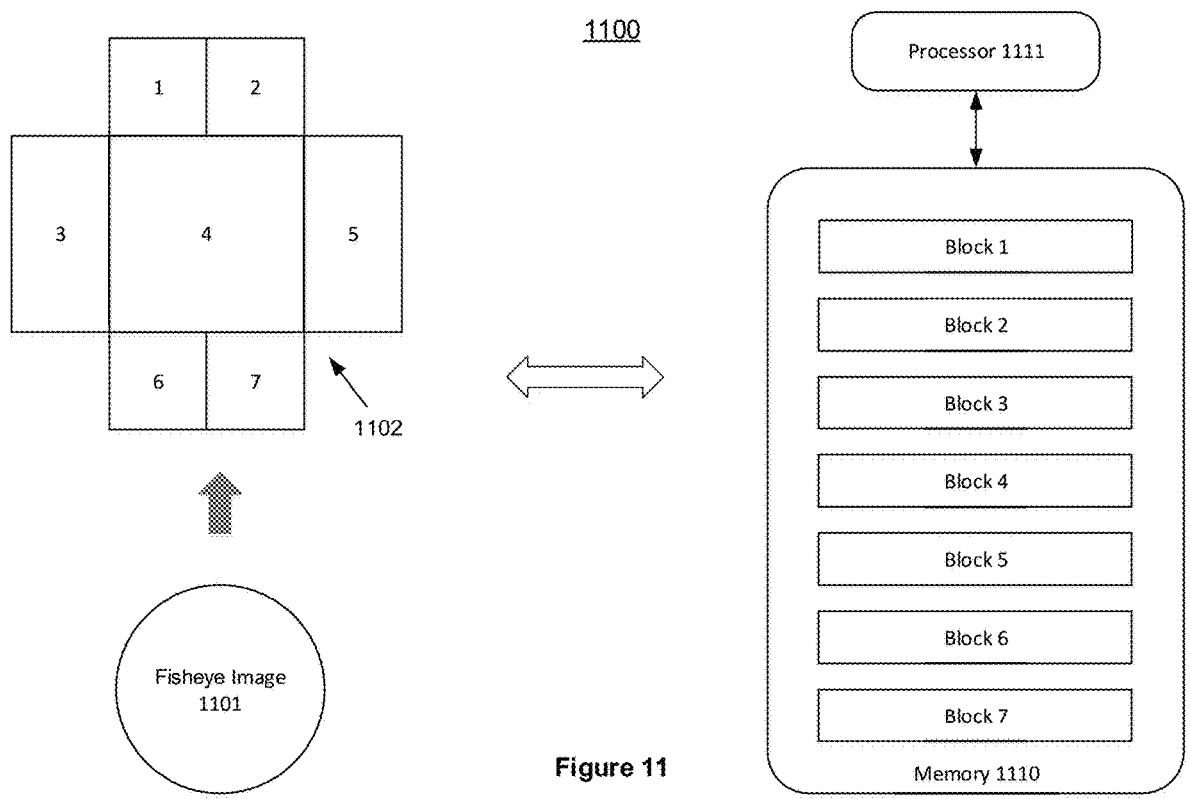
FIG. 11 illustrates a division scheme for rectifying a fisheye image using a mesh-based approach, in accordance with various embodiments of the present disclosure.

FIG. 11 illustrates a division scheme for rectifying a fisheye image using a mesh-based approach, in accordance with various embodiments of the present disclosure. As shown in FIG. 11, using the division scheme 1100, the target image 1101 can be divided into multiple blocks (e.g. blocks 1-7) for efficiently performing the rectification task. Furthermore, the rectification task can be performed separately (sequentially or in parallel) for each individual block of the target image 1102. Afterwards, the system can integrate the result for each individual block together into a target image 1102.

In accordance with various embodiments, in order to compute the pixel values for the target pixels in each individual image block 1-7, a processor 1111 can read in a corresponding block of fisheye image 1101 into the memory 1110 for supporting the computation. The processor 1111 can compute the projected coordinate for each target pixel within an individual image block, based on the pre-stored projected coordinates for selected mesh points in the respective image block.

Referring back to FIG. 8, for ease of implementation and achieving input/output (I/O) efficiency, the processor performing the rectification of a fisheye image 801 can take advantage of a minimum bounding rectangular area that encloses the projected coordinates 811 in the fisheye image 801 (for the mesh points 812). Due to the geometry distortion, a rectangular shape in the target image (with the mesh points 812 at four corners) can be projected into an irregular geometry shape in the fisheye image. Thus, the minimum bounding rectangular area for such an irregular shape may cover a substantial area of the fisheye image 801, especially for mesh points close to the edge of the fisheye image 801.

In accordance with various embodiments, the division of the target image 1101 can take into consideration the distortion of the fisheye image at the edge portion. In some instance, the system can alleviate the memory and I/O consumption by applying a division scheme on the target image. For example, the up and bottom portions of the target image 1102 can be further divided into multiple blocks, e.g. blocks (1, 2) and (6, 7) respectively, in order to reduce the width of the image block for performing the rectification calculation. Alternatively, depending on the division scheme, the left and right portions of the target image 1102 can be further divided into multiple blocks (e.g. into vertical stacks of blocks). Thus, the rectification processor 1111 can avoid the need for handling a large area of pixel values in the fisheye image when the rectification is performed. Afterwards, the different portions of the target image 1101 can be combined together for output.

Figure 12:
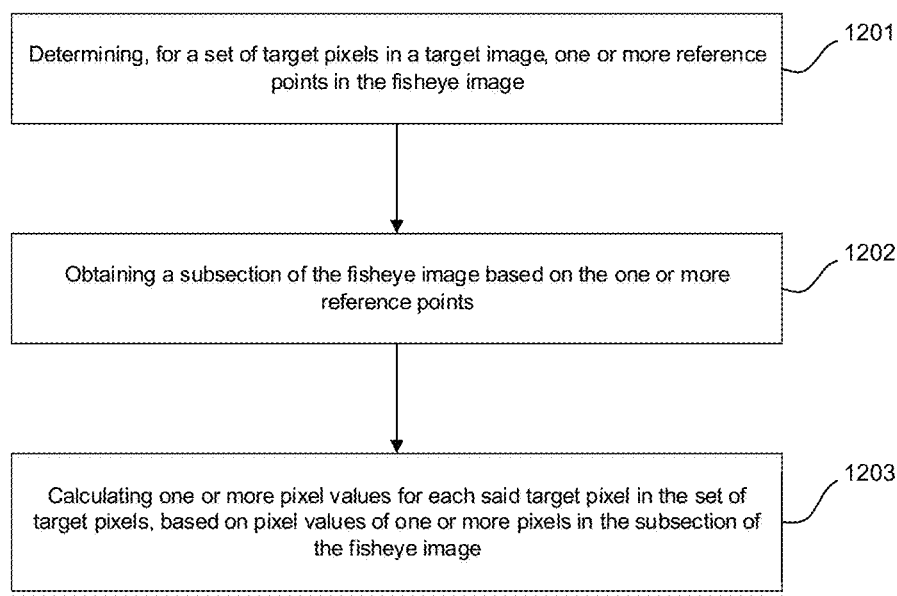
FIG. 12 shows a flowchart of rectifying a fisheye image captured using a fisheye lens, in accordance with various embodiments of the present disclosure.

FIG. 12 shows a flowchart of rectifying a fisheye image captured using a fisheye lens, in accordance with various embodiments of the present disclosure. As shown in FIG. 12, at step 1201, the system can determine, for a set of target pixels in a target image, one or more reference points in the fisheye image. Furthermore, at step 1202, the system can obtain a subsection of the fisheye image based on the one or more reference points. Then, at step 1203, the system can calculate one or more pixel values for each said target pixel in the set of target pixels, based on pixel values of one or more pixels in the subsection of the fisheye image.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. An image rectification method comprising:
    determining, for a plurality of target pixels in a target image, one or more reference points in a raw image captured using a lens;
    determining one or more coordinates for each of the one or more reference points in the raw image based on a projection model, wherein the projection model is based on a reference coordinate system established using one or more calibration parameters for the lens;
    obtaining a subsection of the raw image based on the one or more reference points; and
    for each of the plurality of target pixels, calculating a target pixel value based on one or more pixel values of one or more pixels in the subsection of the raw image;
    wherein:
        the plurality of target pixels are within a subsection of the target image;
        the subsection of the target image is in a rectangular shape with four corner points;
        the one or more reference points in the raw image correspond to the four corner points of the subsection of the target image; and
        the subsection of the raw image is a minimum bounding rectangle that encloses the one or more reference points.

2. The method of claim 1, wherein the subsection of the raw image enclosing the one or more reference points is obtained from a portion of the raw image based on a division scheme.

3. The method of claim 2, wherein the division scheme is optimized for memory usage.

4. The method of claim 1, further comprising:
    determining one or more projected coordinates in the subsection of the raw image, relative to the one or more reference points, that correspond to one target pixel of the plurality of target pixels in the target image.

5. The method of claim 4, further comprising:
    selecting, for the one target pixel, a neighboring block in the subsection of the raw image based on the one or more projected coordinates in the subsection of the raw image.

6. The method of claim 5, wherein the neighboring block comprises four neighboring pixels in the subsection of the raw image.

7. An image rectification system comprising:
    a memory that stores one or more computer-executable instructions; and
    one or more processors configured to access the memory and execute the computer-executable instructions to perform a method comprising:
        determining, for a plurality of target pixels in a target image, one or more reference points in a raw image captured using a lens;
        determining one or more coordinates for each of the one or more reference points in the raw image based on a projection model, wherein the projection model is based on a reference coordinate system established using one or more calibration parameters for the lens;
        obtaining a subsection of the raw image based on the one or more reference points; and
        for each of the plurality of target pixels, calculating a target pixel value based on one or more pixel values of one or more pixels in the subsection of the raw image;
    wherein:
        the plurality of target pixels are within a subsection of the target image;
        the subsection of the target image is in a rectangular shape with four corner points;
        the one or more reference points in the raw image correspond to the four corner points of the subsection of the target image; and
        the subsection of the raw image is a minimum bounding rectangle that encloses the one or more reference points.

8. The system of claim 7, wherein the subsection of the raw image enclosing the one or more reference points is obtained from a portion of the raw image based on a division scheme.

9. The system of claim 8, wherein the division scheme is optimized for memory usage.

10. The system of claim 7, wherein one or more projected coordinates in the subsection of the raw image, relative to the one or more reference points, are determined corresponding to one target pixel of the plurality of target pixels in the target image.

11. The system of claim 10, wherein a neighboring block in the subsection of the raw image is selected for the one target pixel based on the one or more projected coordinates in the subsection of the raw image.

12. An image rectification method comprising:
    obtaining a projection model for a lens based on a reference coordinate system established using one or more calibration parameters for the lens, wherein the projection model corresponds a raw image captured using the lens with a plurality of target image portions in a target image;
    determining, based on the projection model, one or more coordinates for each of a plurality of reference pixels in the raw image for a target pixel in the plurality of target image portions;
    obtaining a subsection of the raw image based on the plurality of reference pixels; and
    calculating a target pixel value for the target pixel based on the plurality of reference pixels in the raw image;
    wherein:
        the plurality of target image portions are in a subsection of the target image having a rectangular shape with four corner points;
        the plurality of reference pixels in the raw image correspond to the four corner points of the subsection of the target image; and
        the subsection of the raw image is a minimum bounding rectangle that encloses the plurality of reference pixels.

* * * * *